(12) United States Patent
Maruyama

(10) Patent No.: US 10,970,019 B2
(45) Date of Patent: Apr. 6, 2021

(54) INFORMATION PROCESSING APPARATUS, NON-TRANSITORY COMPUTER READABLE MEDIUM, IMAGE FORMING APPARATUS, AND INFORMATION PROCESSING SYSTEM TO DISPLAY CONVERTED DESCRIPTION CONTENT BEFORE COMPLETION OF CONVERSION

(71) Applicant: FUJI XEROX CO., LTD., Tokyo (JP)

(72) Inventor: Satoshi Maruyama, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 177 days.

(21) Appl. No.: 16/035,818

(22) Filed: Jul. 16, 2018

(65) Prior Publication Data
US 2019/0050180 A1 Feb. 14, 2019

(30) Foreign Application Priority Data
Aug. 9, 2017 (JP) .............................. JP2017-154446

(51) Int. Cl.
*G06F 3/12* (2006.01)
*H04N 1/00* (2006.01)

(52) U.S. Cl.
CPC .......... *G06F 3/1247* (2013.01); *G06F 3/1206* (2013.01); *G06F 3/1255* (2013.01); *G06F 3/1256* (2013.01); *G06F 3/1285* (2013.01); *H04N 1/0044* (2013.01)

(58) Field of Classification Search
None
See application file for complete search history.

(56) References Cited

U.S. PATENT DOCUMENTS

| 8,947,720 | B2 | 2/2015 | Shiraga | |
|---|---|---|---|---|
| 2009/0231647 | A1* | 9/2009 | Tonami | H04N 1/0044 358/527 |
| 2011/0038002 | A1* | 2/2011 | Nakamura | G06F 3/121 358/1.15 |
| 2014/0354851 | A1* | 12/2014 | Yasuoka | G06F 16/11 348/231.99 |
| 2015/0015912 | A1* | 1/2015 | Kasahara | G06F 3/1206 358/1.15 |
| 2018/0373479 | A1* | 12/2018 | Nakajima | G06F 3/1207 |

FOREIGN PATENT DOCUMENTS

JP 2014-167735 A 9/2014

* cited by examiner

*Primary Examiner* — Miya J Williams
(74) *Attorney, Agent, or Firm* — Oliff PLC

(57) ABSTRACT

An information processing apparatus includes a controller that receives a file a description format of which is to undergo conversion and a request for the conversion of the description format of the file and that performs control to cause a display device to display an image representing content of the file before the conversion of the description format of the file is complete.

18 Claims, 12 Drawing Sheets

INFORMATION PROCESSING APPARATUS, NON-TRANSITORY COMPUTER READABLE MEDIUM, IMAGE FORMING APPARATUS, AND INFORMATION PROCESSING SYSTEM TO DISPLAY CONVERTED DESCRIPTION CONTENT BEFORE COMPLETION OF CONVERSION

CROSS-REFERENCE TO RELATED APPLICATIONS

This application is based on and claims priority under 35 USC 119 from Japanese Patent Application No. 2017-154446 filed Aug. 9, 2017.

BACKGROUND

(i) Technical Field

The present invention relates to an information processing apparatus, a non-transitory computer readable medium, an image forming apparatus, and an information processing system.

(ii) Related Art

Among information processing apparatuses that perform information processing of data and then provide a predetermined service, some information processing apparatuses directly receive a service target file and then perform information processing.

For example, among image forming apparatuses that are exemplified as such an information processing apparatus, some image forming apparatuses use, as a method for printing the content of a file on a recording medium, a method called a direct printing. In the direct printing, a file directly transferred without using a driver is converted to a file described in a page description language that is a language for drawing an image, and printing is then performed on a recording medium.

Printing a file through the direct printing has the following benefit. For example, to perform printing, a file does not have to be opened by using a printing application before printing. The file is printed by only transferring the file to an image forming apparatus. Accordingly, the direct printing has been widely used as a printing method.

If a transferred file has content in a description format not able to be interpreted by the image forming apparatus due to a version difference of the file, the content of the file is sometimes converted to different content from the original content of the file. Accordingly, an information processing apparatus such as an image forming apparatus that directly receives a file and performs information processing causes a user who requests a service to check the file conversion result and then performs processing in accordance with a check result designated by the user in some cases. These cases include a case where the information processing apparatus completes converting the content of the file and thereafter causes the user to check the conversion result.

SUMMARY

According to an aspect of the invention, there is provided an information processing apparatus including a controller that receives a file a description format of which is to undergo conversion and a request for the conversion of the description format of the file and that performs control to cause a display device to display an image representing content of the file before the conversion of the description format of the file is complete.

BRIEF DESCRIPTION OF THE DRAWINGS

Exemplary embodiments of the present invention will be described in detail based on the following figures, wherein.

DETAILED DESCRIPTION

Figure 1:
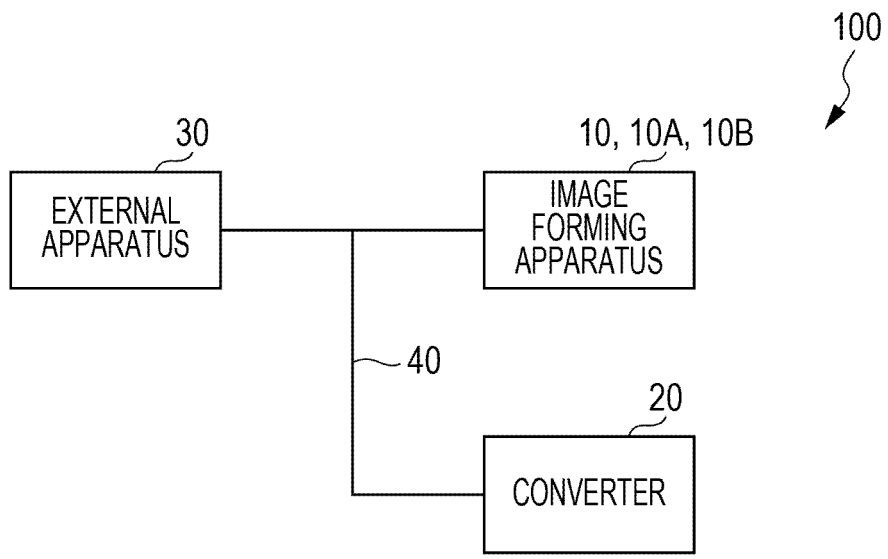
FIG. 1 is a diagram illustrating an example configuration of an information processing system.

Hereinafter, exemplary embodiments will be described with reference to the drawings. Note that components and processes having the same functions in the drawings are denoted by the same reference numerals, and repeated description is omitted.

First Exemplary Embodiment

FIG. 1 is a diagram illustrating an example configuration of an information processing system 100 according to a first exemplary embodiment. As illustrated in FIG. 1, an image forming apparatus 10 that is an example of an information processing apparatus, a converter 20, and an external apparatus 30 are connected together by using a communication network 40 in the information processing system 100.

The external apparatus 30 transmits an image forming target file to the image forming apparatus 10 via the communication network 40.

The term "file" denotes an aggregate of data items by which information is described in a predetermined description format. The aggregate of the data items is interpreted on the basis of a description format used for generating the file and is thereby restored as information having a specific meaning. The term "to interpret the content of a file" denotes to decode a define statement (a command) for information described in the description format of the file and to restore the information represented by the file.

The image forming apparatus 10 includes an image forming unit and a display unit. The image forming unit forms an image on a recording medium P that is used for forming an image, such as paper or an overhead projector (OHP) sheet. The display unit displays the layout of the image to be formed on the recording medium P in accordance with the content of a received file. The image forming apparatus 10 transmits the file received from the external apparatus 30 to the converter 20. From the converter 20, the image forming apparatus 10 receives an image representing the content of the transmitted file and also receives a converted file having undergone conversion of the content of the file described in a specific description format to a command for image drawing such as a page description language. The image forming apparatus 10 causes the display unit to display an image representing the content of the file received from the converter 20 and causes the image forming unit to form an image represented by the converted file received from the converter 20 on the recording medium P. That is, the image forming apparatus 10 images the content of the received file on the recording medium P by using the direct printing function.

Hereinafter, "an image representing the content of a file" displayed on the display unit is referred to as "a preview image" and is discriminated from an image formed on the recording medium P on the basis of the converted file. A preview image is an image representing the content of a file, for example, in a thumbnail form and represents the layout of the image to be formed on the recording medium P on the basis of the converted file. That is, the preview image is an image used for checking the layout to be observed when the content of the file is imaged on the recording medium P. Note that since the data amount of the preview image is smaller than the data amount of the converted file, it takes a shorter time to generate the preview image than a time to generate the converted file.

The term "layout" denotes arrangement of objects such as a character, a graphic, an image, and a symbol, and the size, color, shape, location, or orientation of each object to be placed is indicated by the arrangement. For example, in the case of a character, layout information indicating the location, the size, the color, the type (font type), the presence or absence of text decoration (such as an underline or emphasis), the style such as italic type or bold type, or the orientation of the character is designated by using a command conforming to the description format of the file. Note that the page description language is an example of a predetermined description format in the converted file.

The converter 20 receives, from the image forming apparatus 10, the file transmitted by the external apparatus 30. The converter 20 generates a preview image from the received file and generates a converted file in which the description format of the file is converted to a description format for image drawing used by the image forming apparatus 10. The converter 20 transmits the generated preview image and the converted file to the image forming apparatus 10. That is, the converter 20 is an example of a converter that converts a description format of a file.

Note that the recording medium P used by the image forming apparatus 10 is not limited to paper or an OHP sheet. The recording medium P may be made of any material as long as an image to be formed is fixed on the surface of the material. In addition, the communication network 40 may be a wired or wireless network, an internal local area network (LAN), or a wide area network (WAN) using a dedicated network or a public network. Although FIG. 1 illustrates only one external apparatus 30, multiple external apparatuses 30 may be connected to the communication network 40.

An example configuration of each of the image forming apparatus 10, the converter 20, and the external apparatus 30 included in the information processing system 100 will be described.

Figure 2:
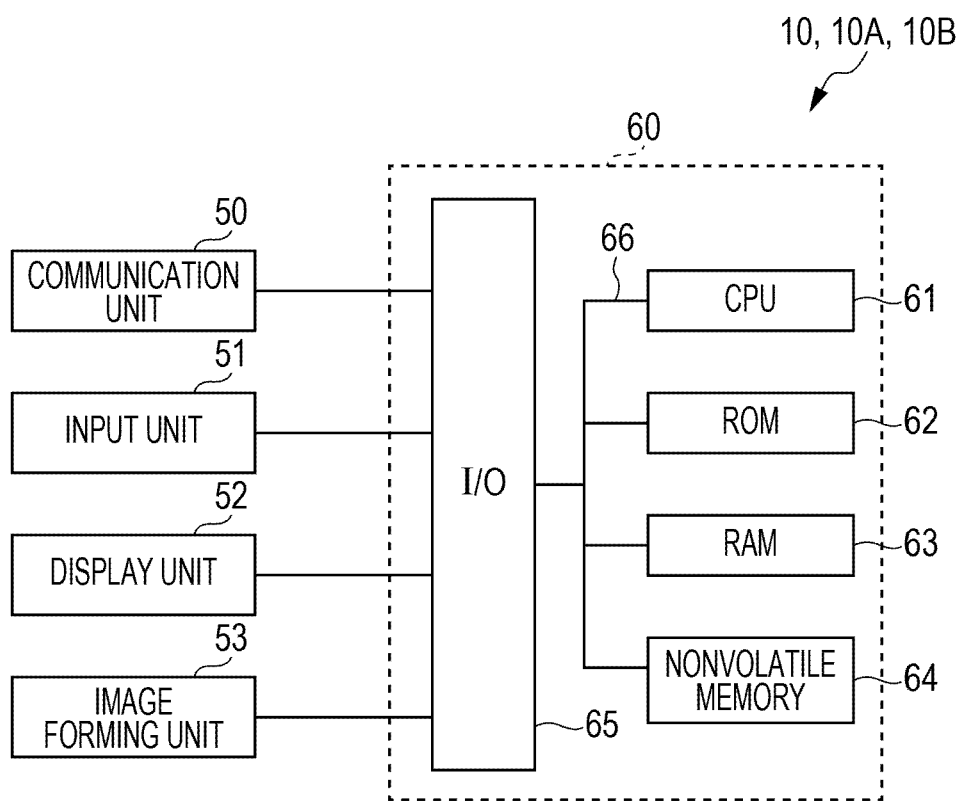
FIG. 2 is a diagram illustrating an example configuration of a principal part of an electrical system in an image forming apparatus.

FIG. 2 is a diagram illustrating an example configuration of a principal part of an electrical system in the image forming apparatus 10. The image forming apparatus 10 is composed of, for example, a computer 60.

The computer 60 includes a central processing unit (CPU) 61 that is an example of a controller and a generator according to this exemplary embodiment, a read only memory (ROM) 62, a random access memory (RAM) 63, a nonvolatile memory 64, and an input/output interface (I/O) 65. The CPU 61, the ROM 62, the RAM 63, the nonvolatile memory 64, and the I/O 65 are connected to each other via a bus 66.

For example, a communication unit 50, an input unit 51, a display unit 52, and an image forming unit 53 are connected to the I/O 65.

The communication unit 50 has a communication protocol for exchanging various data items between the converter 20 and the external apparatus 30.

The input unit 51 is a device that receives an instruction from a user and notifies the CPU 61 of the instruction. The input unit 51 includes, for example, a button, a touch panel, a keyboard, a mouse, and other devices.

The display unit 52 is a device that displays, as an image, information processed by the CPU 61 and includes, for example, a liquid crystal display, an organic electro luminescence (EL) display, and other devices. The display unit 52 is an example of a display device that displays a preview image.

The image forming unit 53 is a device that forms, on the recording medium P, an image corresponding to the content of the converted file that has undergone conversion to the description format for image drawing and that corresponds to a received file. An image forming system used by the image forming unit 53 may be any system, and may be for example, an electrophotographic system or an inkjet system. The image forming unit 53 is an example of an image forming unit.

Note that units and the like connected to the I/O 65 are not limited to the units illustrated in FIG. 2. For example, a unit such as a scanner unit that optically reads the content of a document, a copier unit that causes the image forming unit 53 to image, as an image on the recording medium P, the content of the document read by the scanner unit, or a fax machine unit that transmits and receives image data via a public network and that causes the image forming unit 53 to image, as an image, received image data on the recording medium P may be connected to the I/O 65.

Figure 3:
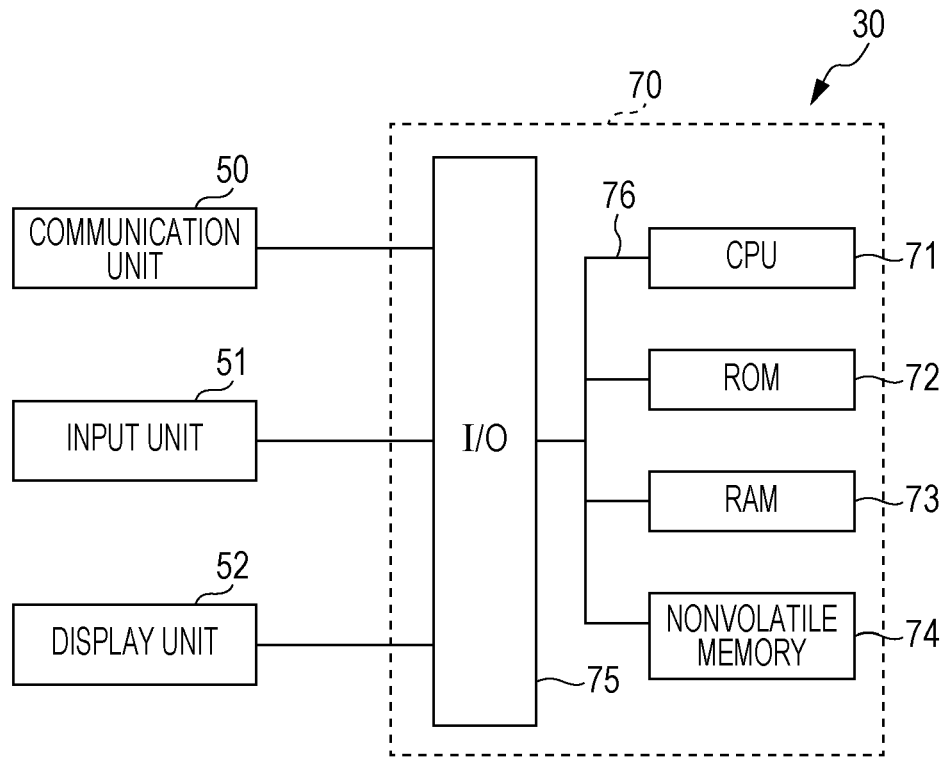
FIG. 3 is a diagram illustrating an example configuration of a principal part of an electrical system in an external apparatus.

FIG. 3 is a diagram illustrating an example configuration of a principal part of an electrical system in the external apparatus 30. The external apparatus 30 is composed of, for example, a computer 70.

The computer 70 includes a CPU 71, a ROM 72, a RAM 73, a nonvolatile memory 74, and an I/O 75 like the computer 60 illustrated in FIG. 2. The CPU 71, the ROM 72, the RAM 73, the nonvolatile memory 74, and the I/O 75 are connected to each other via a bus 76.

For example, a communication unit 50, an input unit 51, and a display unit 52 are connected to the I/O 75.

Note that the communication unit 50 of the external apparatus 30 transmits and receives various data items to and from the image forming apparatus 10 and does not directly communicate with the converter 20.

Figure 4:
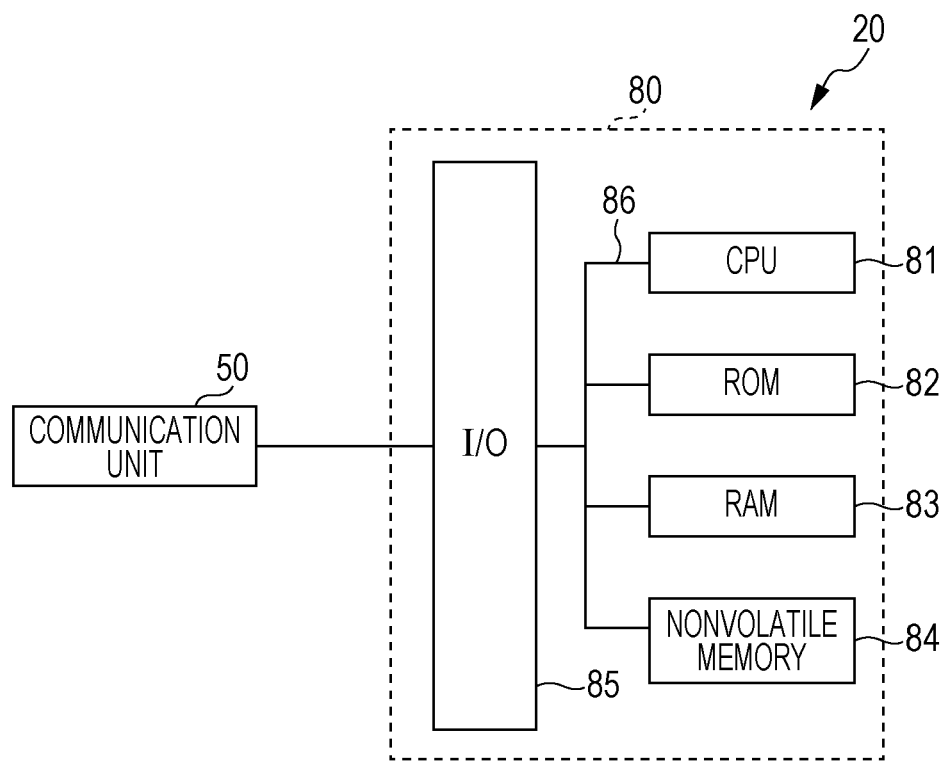
FIG. 4 is a diagram illustrating an example configuration of a principal part of an electrical system in a converter.

FIG. 4 is a diagram illustrating an example configuration of a principal part of an electrical system in the converter 20. The converter 20 is composed of, for example, a computer 80.

The computer 80 includes a CPU 81, a ROM 82, a RAM 83, a nonvolatile memory 84, and an I/O 85 like the computer 60 illustrated in FIG. 2. The CPU 81, the ROM 82, the RAM 83, the nonvolatile memory 84, and the I/O 85 are connected to each other via a bus 86.

For example, a communication unit 50 is connected to the I/O 85. The communication unit 50 of the converter 20 transmits and receives various data items to and from the image forming apparatus 10 and does not directly communicate with the external apparatus 30.

Figure 5:
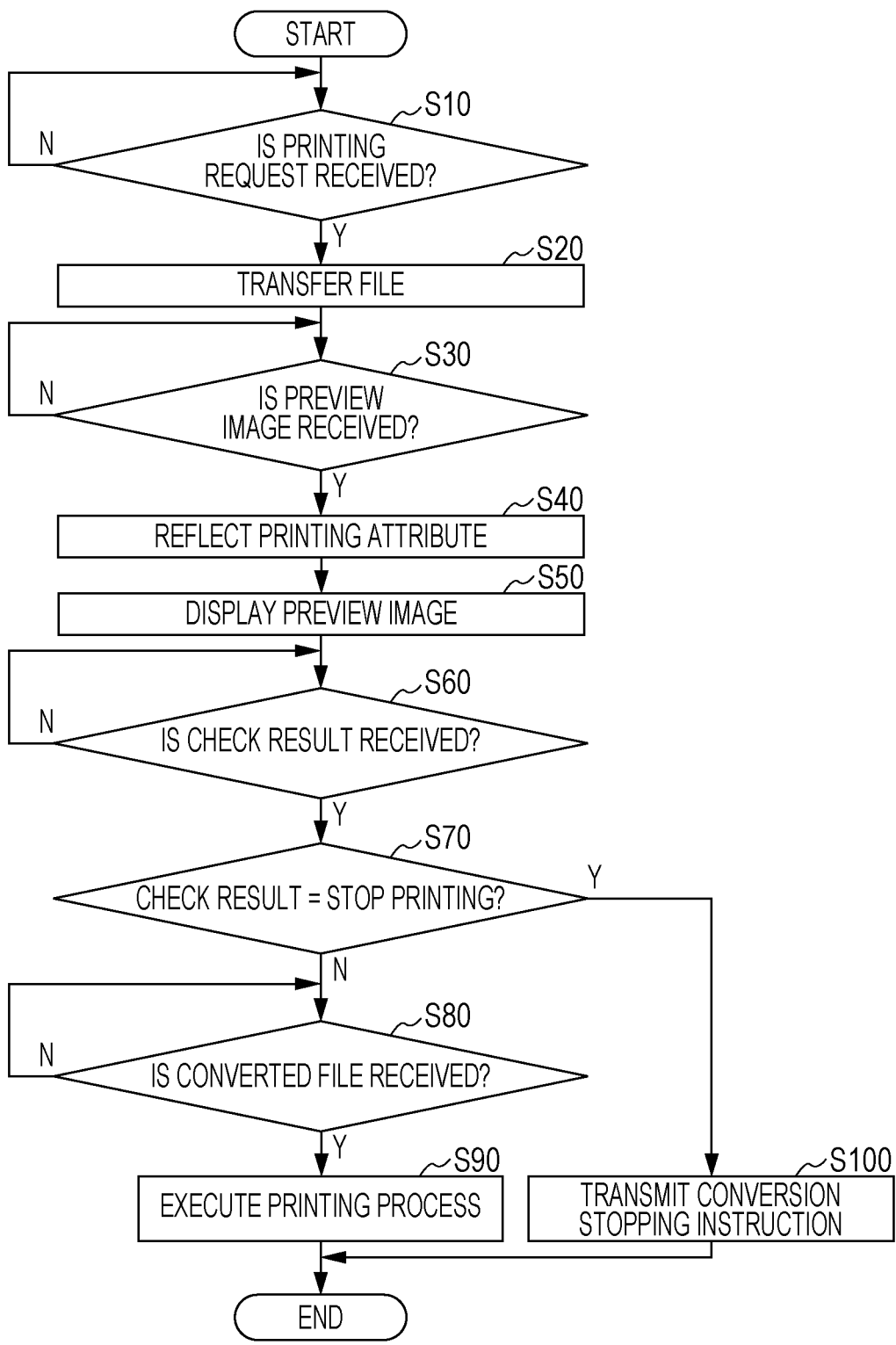
FIG. 5 is a flowchart illustrating an example flow of an image forming process executed by the image forming apparatus according to a first exemplary embodiment.
Figure 6:
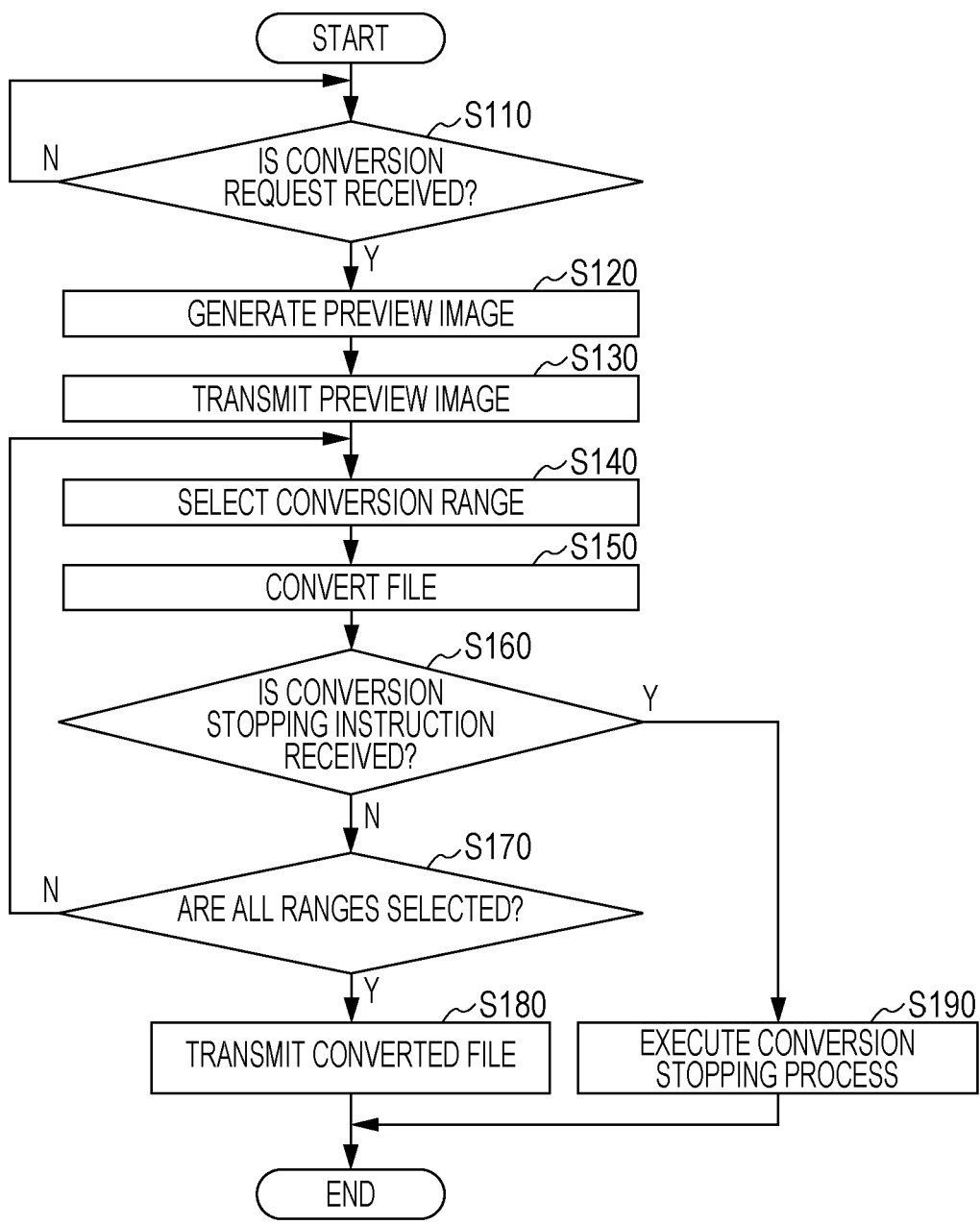
FIG. 6 is a flowchart illustrating an example flow of a conversion process executed by the converter.
Figure 7:
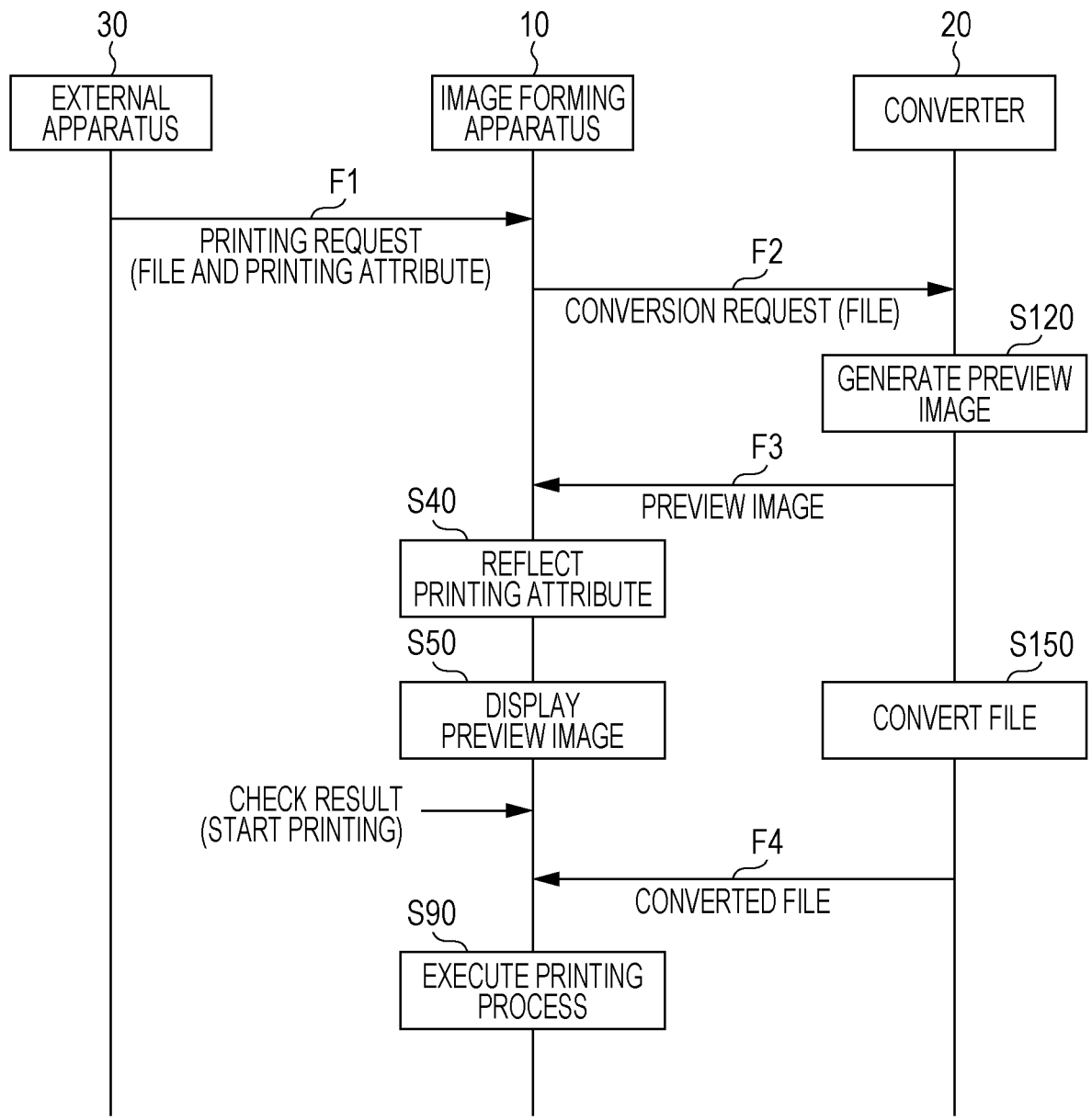
FIG. 7 is a sequence diagram illustrating an example case where an image is formed on a recording medium in the first exemplary embodiment.
Figure 8:
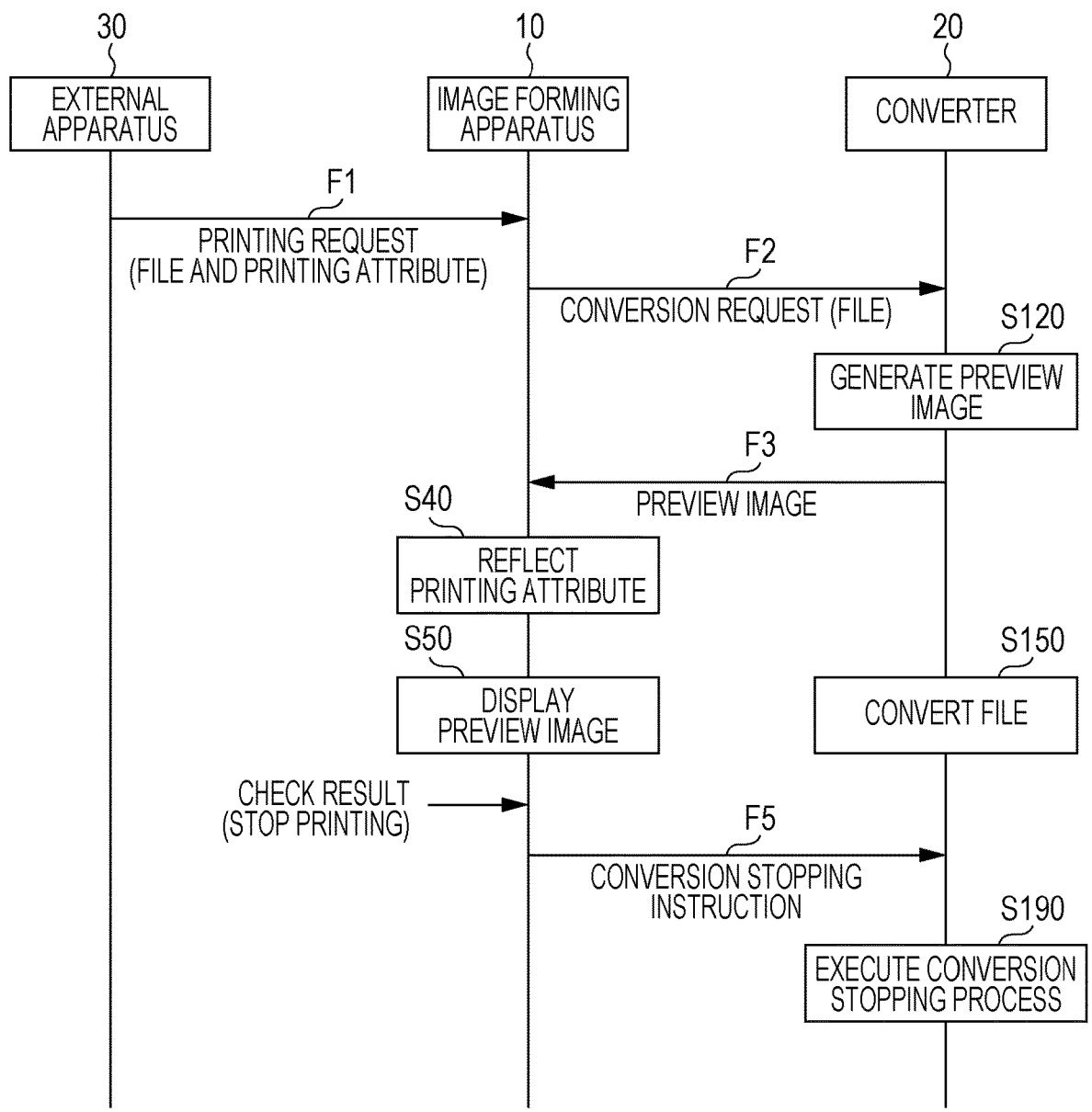
FIG. 8 is a sequence diagram illustrating an example case where image forming is stopped in the first exemplary embodiment.

Actions of the information processing system 100 will be described with reference to FIGS. 5 to 8. FIG. 5 is a flowchart illustrating an example flow of an image forming process executed by the CPU 61 after the image forming apparatus 10 is started. FIG. 6 is a flowchart illustrating an example flow of a conversion process executed by the CPU 81 after the converter 20 is started. FIG. 7 is a sequence diagram illustrating an example case where the image forming apparatus 10 forms an image on the recording medium P. FIG. 8 is a sequence diagram illustrating an example case where the image forming apparatus 10 stops image forming.

An image forming program describing the image forming process is stored in advance, for example, in the ROM 62 of the image forming apparatus 10. The CPU 61 of the image forming apparatus 10 reads the image forming program stored in the ROM 62 and executes the image forming process. A conversion program describing the conversion process is stored in advance, for example, in the ROM 82 of the converter 20. The CPU 81 of the converter 20 reads the conversion program stored in the ROM 82 and executes the conversion process.

Actions of the information processing system 100 will herein be described by using an example image forming process in which the image forming apparatus 10 images the content of the file received from the external apparatus 30 on the recording medium P. For example, the image forming apparatus 10 according to this exemplary embodiment does not include a converter that interprets the content of the file received from the external apparatus 30 and that converts the received file to a converted file including a command for image drawing. A file is configured, for example, on a per-page basis. Hereinafter, the term "printing" denotes forming an image on the recording medium P.

In step S10 in FIG. 5, the CPU 61 judges whether a printing request is received from the external apparatus 30 via the communication network 40 (see F1 in FIGS. 7 and 8). If the printing request is not received, the CPU 61 repeats step S10 and monitors whether the printing request is received. If the printing request is received, the process moves to step S20.

The printing request includes a file to be printed and a printing attribute and is a telegraphic message for requesting the image forming apparatus 10 to print the file. The printing request may include a user identification (ID) identifying a user who transmits the printing request.

The printing attribute is a value for controlling the layout of an image, the value being used when the content of the file is printed. Examples of the printing attribute include setting items such as the number of pages to be formed per recording medium P, whether to perform color printing, and a printing location on the recording medium P, that is, binding margins in top, bottom, right, and left parts of the recording medium P. The printing attribute is an example of a forming attribute to be used when the content of the file is imaged on the recording medium P.

In step S20, the CPU 61 transfers a conversion request including the file received in step S10 to the converter 20 (see F2 in FIGS. 7 and 8). The converter 20 thereby generates a preview image of the transferred file and transmits the preview image to the image forming apparatus 10 (see F3 in FIGS. 7 and 8), as to be described later.

In step S30, the CPU 61 judges whether the preview image is received from the converter 20 via the communication network 40. If the preview image is not received, the CPU 61 repeats step S30 and monitors whether the preview image is received. If the preview image is received, the process moves to step S40.

In step S40, the CPU 61 generates a preview image resulting from reflection of a printing attribute in the preview image received in step S30. The printing attribute is included in the printing request received in step S10. The preview image generated by the converter 20 is generated only in accordance with the content of the file, and the printing attribute is not reflected therein. The layout of the preview image is thus different from that of an image to be actually formed on the recording medium P. Accordingly, the CPU 61 reflects the printing attribute included in the printing request received in step S10 in the preview image received in step S30 and generates the preview image representing the layout of the image to be printed on the recording medium P.

In step S50, the CPU 61 causes the display unit 52 to display the preview image generated and having undergone the reflection of the printing attribute in step S40. The CPU 61 thereby causes the user to check if the layout of the image to be formed on the recording medium P is a desired layout.

In step S60, the CPU 61 judges whether a check result of checking the preview image by the user (a preview-image check result) is received. The preview-image check result is notified to the CPU 61, for example, by pressing one of a Start Printing button and a Stop Printing button of the input unit 51. If the preview-image check result is not received, the CPU 61 repeats step S60 and monitors whether the check result is received. If the check result is received, the process moves to step S70.

In step S70, the CPU 61 judges whether the preview-image check result received in step S60 is Stop Printing notified by pressing the Stop Printing button. If the result of the judgment in step S70 is negative, that is, if the CPU 61 receives Start Printing notified by pressing the Start Printing button, the process moves to step S80.

In step S80, the CPU 61 judges whether a converted file is received from the converter 20 (see F4 in FIG. 7). If the converted file is not received from the converter 20, the CPU 61 repeats step S80 and monitors whether the converted file is received. If the converted file is received, the process moves to step S90.

In step S90, the CPU 61 causes the image forming unit 53 to form, on the recording medium P, an image represented by the converted file received in step S80, the image being formed in accordance with the printing attribute included in the printing request received in step S10.

In contrast, if the result of the judgment in step S70 is affirmative, that is, if Stop Printing notified by pressing the Stop Printing button is received as the preview-image check result, the process moves to step S100.

In step S100, in response to the receiving of the print stopping notification from the user, the CPU 61 transmits, to the converter 20, a conversion stopping instruction for stopping conversion to the converted file (see F5 in FIG. 8). Note that the conversion stopping instruction is an example of an instruction for causing the converter 20 to stop the conversion to the description format of the file.

If the converted file has been received from the converter 20 in the judgment in step S70, the CPU 61 does not have to transmit the conversion stopping instruction to the converter 20 in step S100. The image forming process illustrated in FIG. 5 is then terminated.

Compared with the image forming process executed by the image forming apparatus 10 in this manner, the converter 20 executes the conversion process illustrated in FIG. 6.

In step S110 in FIG. 6, the CPU 81 judges whether the conversion request is received from the image forming apparatus 10 via the communication network 40 (see F2 in FIGS. 7 and 8). If the conversion request is not received, the CPU 81 repeats step S110 and monitors whether the conversion request is received. If the conversion request is received, the process moves to step S120.

In step S120, the CPU 81 generates the preview image of the file included in the conversion request received in step S110.

In step S130, the CPU 81 transmits the preview image generated in step S120 to the image forming apparatus 10 (see F3 in FIGS. 7 and 8).

In step S140, the CPU 81 selects the conversion range of the file to interpret the content of the file included in the conversion request received in step S110 and then to convert the file to the converted file configured by a command for image drawing used by the image forming apparatus 10. Specifically, in a case where a file is configured on a per-page basis like a file according to the exemplary embodiment, the CPU 81 selects an unselected page page by page, for example, from the first page toward the last page. In this case, the order of selecting a page is not limited as long as the page is selected to avoid an unselected page. In addition, multiple pages may be selected at a time as the conversion range.

In step S150, the CPU 81 interprets the content of the conversion range selected in step S140, converts the content of the conversion range described in a specific description format to the command for image drawing used by the image forming apparatus 10, and thereby generates the converted file.

In step S160, the CPU 81 judges whether the conversion stopping instruction is received during the conversion of the description format of the file (see F5 in FIG. 8). If the conversion stopping instruction is not received, the process moves to step S170.

In step S170, the CPU 81 judges whether all of the ranges in the file included in the conversion request received in step S110 are selected. Specifically, if the file is configured on a per-page basis, the CPU 81 judges whether all of the pages included in the file are selected. If one or more unselected pages are present, the process moves to step S140, and the CPU 81 selects a conversion range from the one or more unselected pages. Subsequently, if the conversion stopping instruction is not notified from the image forming apparatus 10, the CPU 81 repeats steps S140 to S170 until all of the pages of the file are selected. The CPU 81 thereby interprets the content of the file and generates the converted file corresponding to the file included in the conversion request received in step S110.

In contrast, if all of the pages of the file are selected, that is, if the result of the judgment in step S170 is affirmative, the process moves to step S180.

In step S180, the CPU 81 transmits the generated converted file to the image forming apparatus 10 (see F4 in FIG. 7). The CPU 81 terminates the conversion process illustrated in FIG. 6.

If the result of the judgment in step S160 is affirmative, that is, if the conversion stopping instruction is received during the conversion of the description format of the file (see F5 in FIG. 8), the process moves to step S190.

In step S190, the CPU 81 executes a conversion stopping process of the file. Specifically, the CPU 81 discards the converted file being generated, stops the process for converting the content of one or more unconverted pages included in the file to the command for image drawing used by the image forming apparatus 10, and terminates the conversion process illustrated in FIG. 6.

As described above, after generating the preview image and transmitting the preview image to the image forming apparatus 10, the converter 20 of the information processing system 100 according to the first exemplary embodiment starts generating the converted file. Accordingly, the image forming apparatus 10 causes the display unit 52 to display the preview image before the converter 20 completes the conversion of the file.

The converter 20 transmits the preview image to the image forming apparatus 10 and thereafter starts generating the converted file without delay. Since it takes the user time to check the preview image displayed on the display unit 52 of the image forming apparatus 10 and to notify the image forming apparatus 10 of the preview-image check result, the converter 20 has started converting the file before the preview-image check result is received from the user.

Note that in this exemplary embodiment, the file is configured on a per-page basis, and thus the conversion range is handled on a per-page basis. However, in some files such as a file generated by a spreadsheet application typically used for tallying and analyzing data, data is managed on a per-sheet basis. The term "sheet" is used as a data management unit formed by coupling multiple pages. When receiving a file having data managed on a per-sheet basis, the converter 20 generates a preview image on a per-sheet basis. In this case, the preview image on a per-sheet basis is displayed on the display unit 52 of the image forming apparatus 10.

In addition, when the converter 20 illustrated in FIG. 6 generates the preview image in step S120, the converter 20 does not have to generate a preview image representing the entire content of the file and may generate a preview image representing at least part of the content of the file. In this case, the content of part of the file is displayed as a preview image on the display unit 52 of the image forming apparatus 10.

The term "part of a file" denotes a range set not to include the entire content of the file. For example, when a file is composed of one page, the range corresponds to a range set in the page not to include the entire page. When the file is composed of multiple pages (for example, N pages: N is an integer of 2 or lager), the range corresponds to a range set as, for example, one or more pages the number of which is equal to or less than (N−1).

To judge whether the preview image is to be generated as the entire file or part of a file, for example, the following method is used. Specifically, if the file has a predetermined number of pages or more, a preview image representing part of the file is generated. Since the amount of data included in the file is increased with the increase of the number of pages of the file, the number of pages of the file is an example of the data amount of a file.

Modification of First Exemplary Embodiment

In the description above, the image forming apparatus 10 does not include the converter that interprets the content of a file received from the external apparatus 30 and that converts the received file to a converted file including a command for image drawing. Accordingly, the configuration in which the image forming apparatus 10 transfers every file received from the external apparatus 30 to the converter 20 and requests the converter 20 to generate a preview image and a converted file has heretofore been described. However, an image forming apparatus 10 including the converter may be used. In this case, the image forming apparatus 10 generates a preview image and a converted file of a file having content able to be interpreted by the image forming apparatus 10. The image forming apparatus 10 transfers, to the converter 20, only a file having content not able to be interpreted by the image forming apparatus 10.

Figure 9:
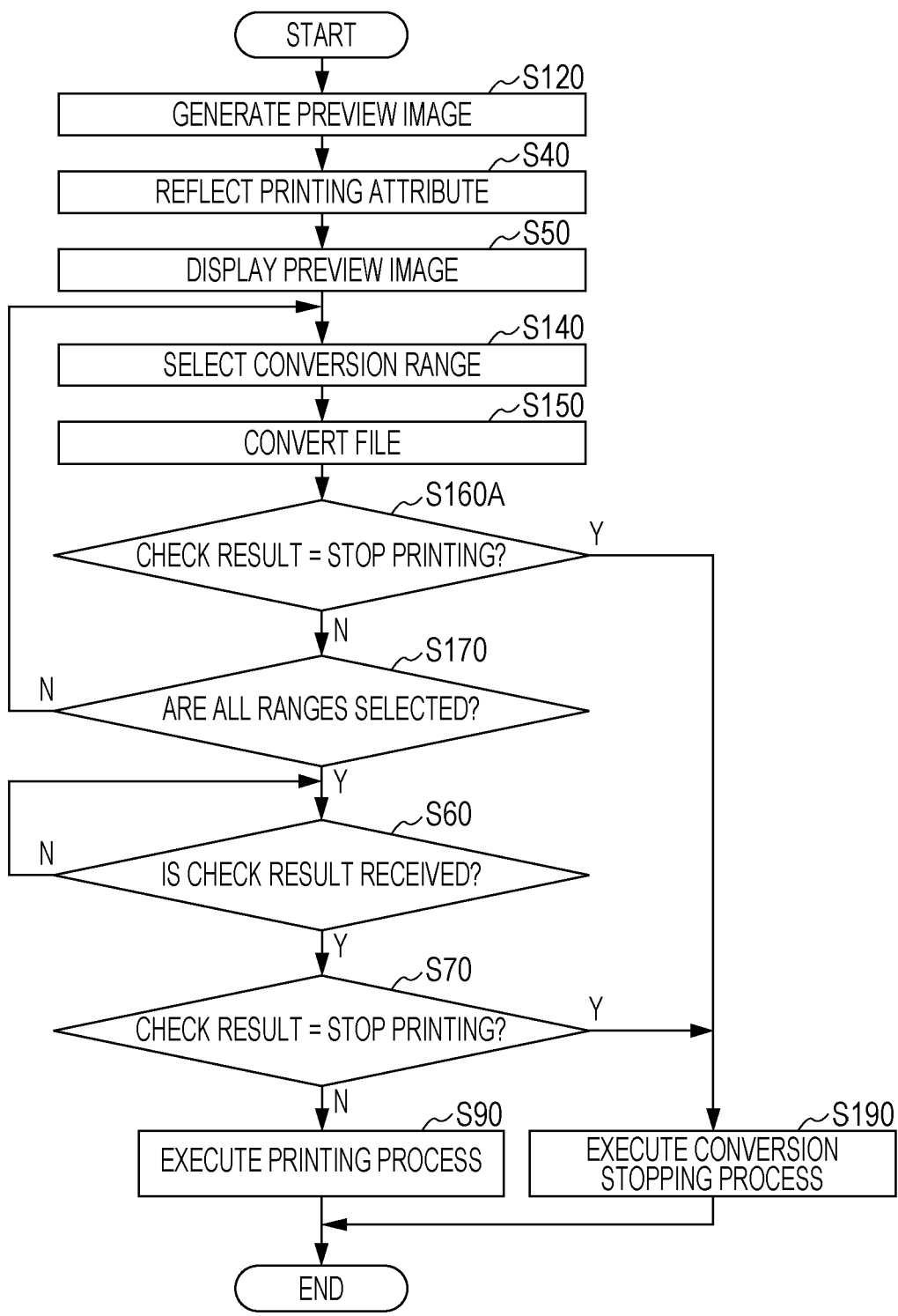
FIG. 9 is a flowchart illustrating an example flow of an image forming process executed by the image forming apparatus according to a modification of the first exemplary embodiment.

FIG. 9 is a flowchart illustrating an example flow of an image forming process executed by the CPU 61 in a case of receiving a printing request including a file able to be interpreted by the image forming apparatus 10 including the converter.

Whether the content of the file is interpretable may be judged in such a manner that if the type and the version of the file is included in registration information in advance registered as the type and the version of an interpretable file, the content of the file is judged to be interpretable. The registration information is stored in advance, for example, in the nonvolatile memory 64. The file type is expressed by an extension included in the file name, and the version of the file is expressed by version information included in a predetermined part of the file.

Suppose a case where the type of a received file is the same as the type included in the registration information, but the version of the file is different from the version included in the registration information. In this case, if the version of the received file is compatible with the version included in the registration information, the content of the file is judged to be interpretable.

In the image forming process illustrated in FIG. 9, the image forming process by the image forming apparatus 10 illustrated in FIG. 5 is mixed with the conversion process by the converter 20 illustrated in FIG. 6. Since steps of the image forming process illustrated in FIG. 9 have been described, the description is focused on a process flow.

First, in step S120, the CPU 61 generates a preview image of a received file. In this case, the CPU 61 does not have to generate a preview image representing the entire content of the file. The CPU 61 may generate a preview image representing at least part of the content of the file.

In step S40, the CPU 61 generates a preview image resulting from reflection of a printing attribute included in a received printing request in the preview image generated in step S120.

In step S50, the CPU 61 causes the display unit 52 to display the preview image generated and having undergone the reflection of the printing attribute in step S40.

In step S140, the CPU 61 selects the conversion range of the file.

In step S150, the CPU 61 interprets the content of the file in the conversion range selected in step S140 and generates a converted file.

In step S160A, the CPU 61 judges whether a Stop Printing check result is received. If the Stop Printing check result is not received, the process moves to step S170. If the Stop Printing check result is received, the process moves to step S190.

In step S170, the CPU 61 judges whether all of the ranges of the file are selected. If one or more unselected pages are present, the process moves to step S140. As long as the Stop Printing check result is not received, the CPU 61 repeats steps S140 to S170 until all of the pages of the file are selected. The CPU 61 thereby interprets the content of the file and generates the converted file.

If all of the pages of the file are selected, and if the result of the judgment in step S170 is affirmative, the process moves to step S60.

In step S60, the CPU 61 judges whether a preview-image check result is received. If the preview-image check result is not received, the CPU 61 repeats step S60 and monitors whether the check result is received. If the check result is received, the process moves to step S70.

In step S70, the CPU 61 judges whether the received preview-image check result is Stop Printing. If the check result is Stop Printing, the process moves to step S190.

In step S190, the CPU 61 executes the conversion stopping process on the file. In contrast, if the check result is Start Printing in the judgment in step S70, the process moves to step S90.

In step S90, the CPU 61 causes the image forming unit 53 to form an image represented by the converted file on the recording medium P in accordance with the printing attribute included in the received printing request.

As described above, if the image forming apparatus 10 receives the interpretable file, the image forming apparatus 10 generates the preview image and the converted file of the file.

Second Exemplary Embodiment

In a second exemplary embodiment, actions of an image forming apparatus 10A that are observed when printing requests are received from the multiple external apparatuses 30 will be described.

The image forming apparatus 10A used by multiple users has congestion of the printing requests from the users in some cases. Accordingly, the image forming apparatus 10A according to the second exemplary embodiment arbitrates between printing requests received from the users for an image forming process.

In an example configuration of a principal part of an electrical system in the image forming apparatus 10A, the image forming apparatus is composed of, for example, the computer 60, like the image forming apparatus 10 illustrated in FIG. 2.

Figure 10:
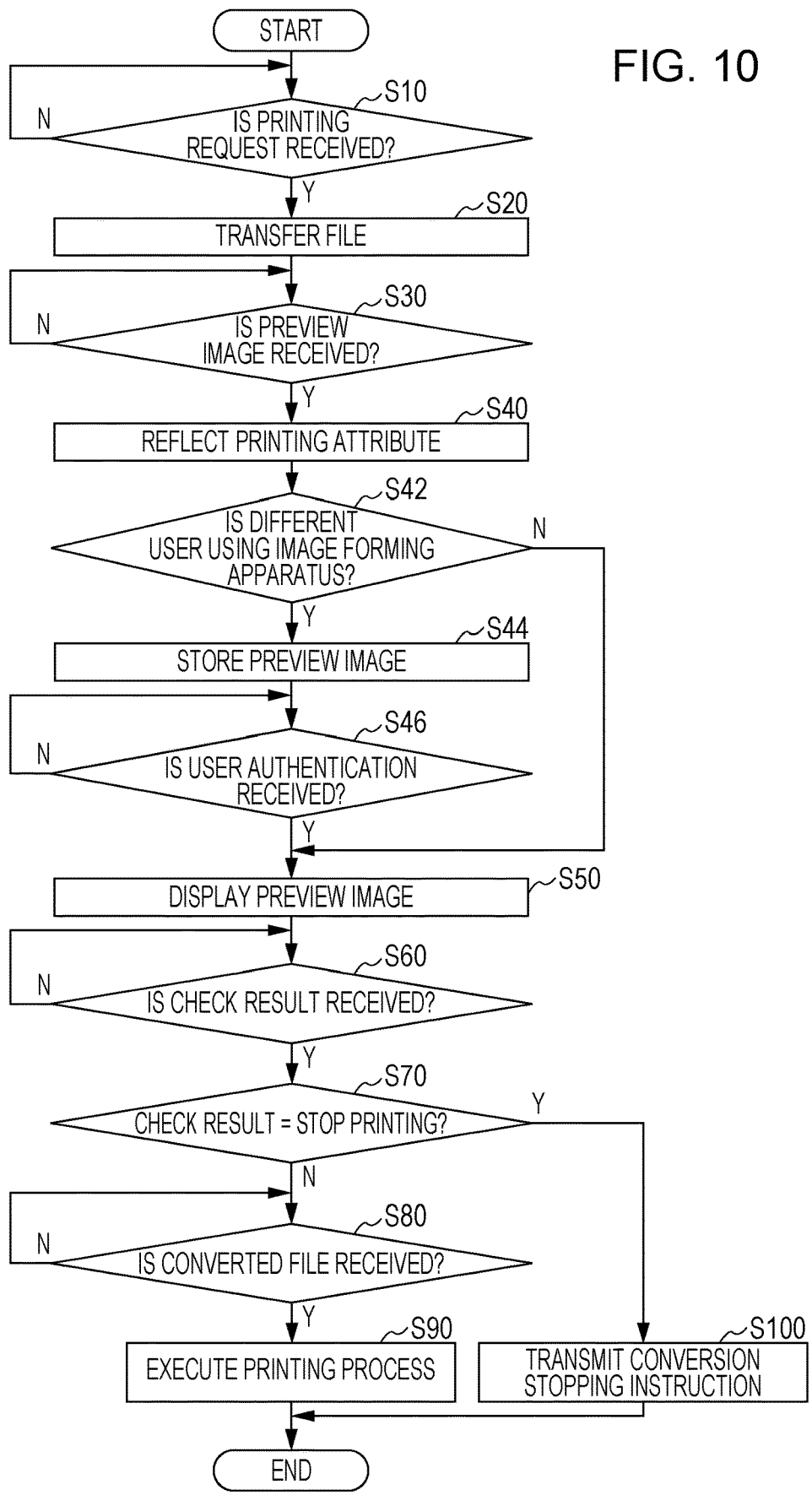
FIG. 10 is a flowchart illustrating an example flow of an image forming process executed by an image forming apparatus according to a second exemplary embodiment.

FIG. 10 is a flowchart illustrating an example flow of an image forming process executed by the CPU 61 after the image forming apparatus 10A is started.

The image forming process illustrated in FIG. 10 is different from the image forming process according to the first exemplary embodiment illustrated in FIG. 5 in that steps S42 to S46 are added. The other steps are the same as those in the image forming process illustrated in FIG. 5.

A printing request received from the external apparatus 30 includes not only a file and a printing attribute but also the user ID of a user who transmits the printing request. A preview image is associated with the user ID of the user who transmits the printing request.

In step S40, the CPU 61 reflects a printing attribute in the preview image received from the converter 20. In step S42 thereafter, the CPU 61 judges whether an image forming process is being executed on the file from a different user who is different from a user having transmitted the printing request for a file corresponding to the received preview image, that is, judges whether the different user is using the image forming apparatus 10A.

In the image forming apparatus 10A used by the multiple users, the user inputs the user ID in the image forming apparatus 10A by using the input unit 51 of the image forming apparatus 10A to associate the received file with the user. If the user who inputs the user ID is a user permitted to use the image forming apparatus 10, the CPU 61 causes the display unit 52 to display a preview image of the file requested by the user to be printed. The CPU 61 thereby compares the user ID input from the input unit 51 with the user ID associated with the preview image. If the user IDs differ from each other, the CPU 61 judges that the different user is using the image forming apparatus 10A, and the process moves to step S44.

Note that a period of time from a time point when a user is permitted to use the image forming apparatus 10A by inputting the user ID from the input unit 51 to a time point when the user inputs a logout instruction for finishing using the image forming apparatus 10A is referred to as an authentication period. The logout instruction causes the authentication period to end, and using the image forming apparatus 10A by the user is finished. The image forming apparatus 10A does not receive the user ID of a different user from the input unit 51 until the authentication period ends.

In step S44, the CPU 61 stores, in the RAM 63, the preview image having undergone the reflection of the printing attribute in step S40. That is, since the different user is using the image forming apparatus 10A, the preview image is prevented from being displayed on the display unit 52 in step S44.

In step S46, the CPU 61 judges whether a new user ID is received after the end of the authentication period of the different user. If a new user ID is not received, the CPU 61 repeats step S46 and monitors whether a new user ID is input. In contrast, if a new user ID is received, and if the received user ID matches the user ID associated with the preview image stored in the RAM 63 in step S44, the process moves to step S50. In step S50, the CPU 61 causes the display unit 52 to display the preview image associated with the user ID input in step S46.

Note that if the user ID received in step S46 does not match the user ID associated with the preview image stored in the RAM 63 in step S44, the CPU 61 may consider a new user ID not to be received and monitor next inputting of a user ID.

As described above, in a case where the preview image is to be displayed on the display unit 52, and if the different user having a user ID different from the user ID associated with the preview image is using the image forming apparatus 10A, the image forming apparatus 10A according to the second exemplary embodiment does not display the preview image until the authentication period of the different user ends. That is, after receiving input of the user ID, the image forming apparatus 10A displays the preview image corresponding to the user ID and prints the file represented by the preview image.

Note that steps of arbitrating between the printing requests received from the users for the image forming process may be added to the image forming process that is the modification of the first exemplary embodiment in such a manner that steps S42 to S46 illustrated in FIG. 10 are added between step S40 and step S50 in the image forming process that is the modification of the first exemplary embodiment and that is illustrated in FIG. 9.

Third Exemplary Embodiment

Each of the image forming apparatus 10 according to the first exemplary embodiment and the image forming apparatus 10A according to the second exemplary embodiment causes the display unit 52 of a corresponding one of the image forming apparatuses 10 and 10A to display the preview image, but the apparatus that displays the preview image is not limited to the image forming apparatuses 10 and 10A.

In a third exemplary embodiment, actions of an image forming apparatus 10B that causes the external apparatus 30 to display a preview image will be described.

In an example configuration of a principal part of an electrical system in the image forming apparatus 10B, the image forming apparatus 10B is composed of, for example, the computer 60, like the image forming apparatus 10 illustrated in FIG. 2.

Figure 11:
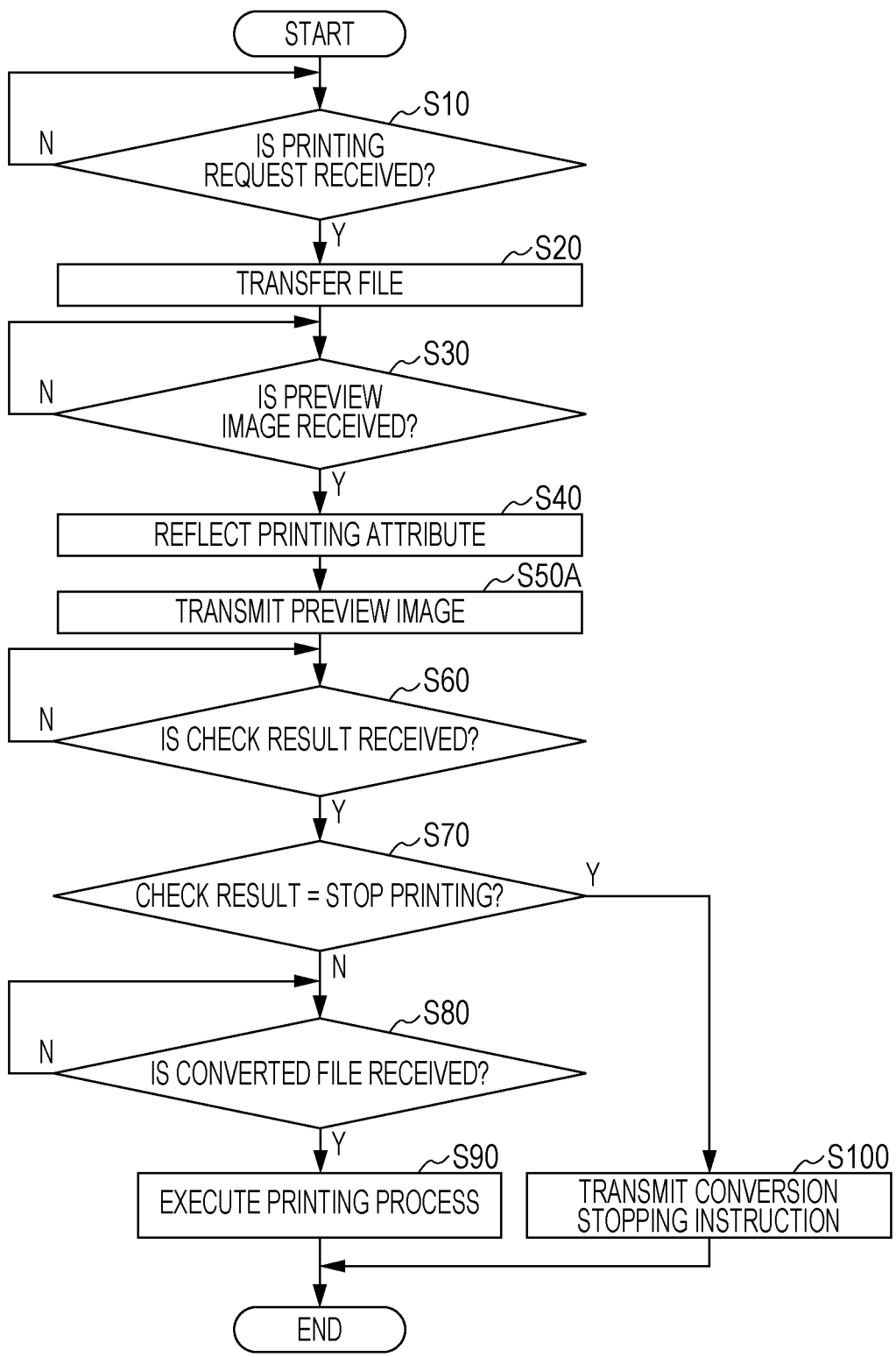
FIG. 11 is a flowchart illustrating an example flow of an image forming process executed by an image forming apparatus according to a third exemplary embodiment.
Figure 12:
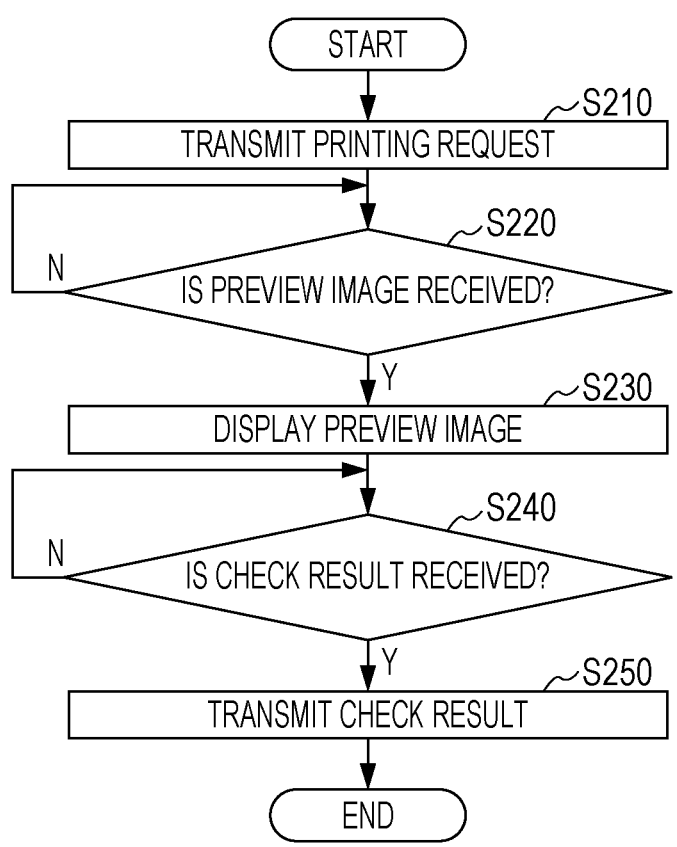
FIG. 12 is a flowchart illustrating an example flow of a printing request process executed by the external apparatus.
Figure 13:
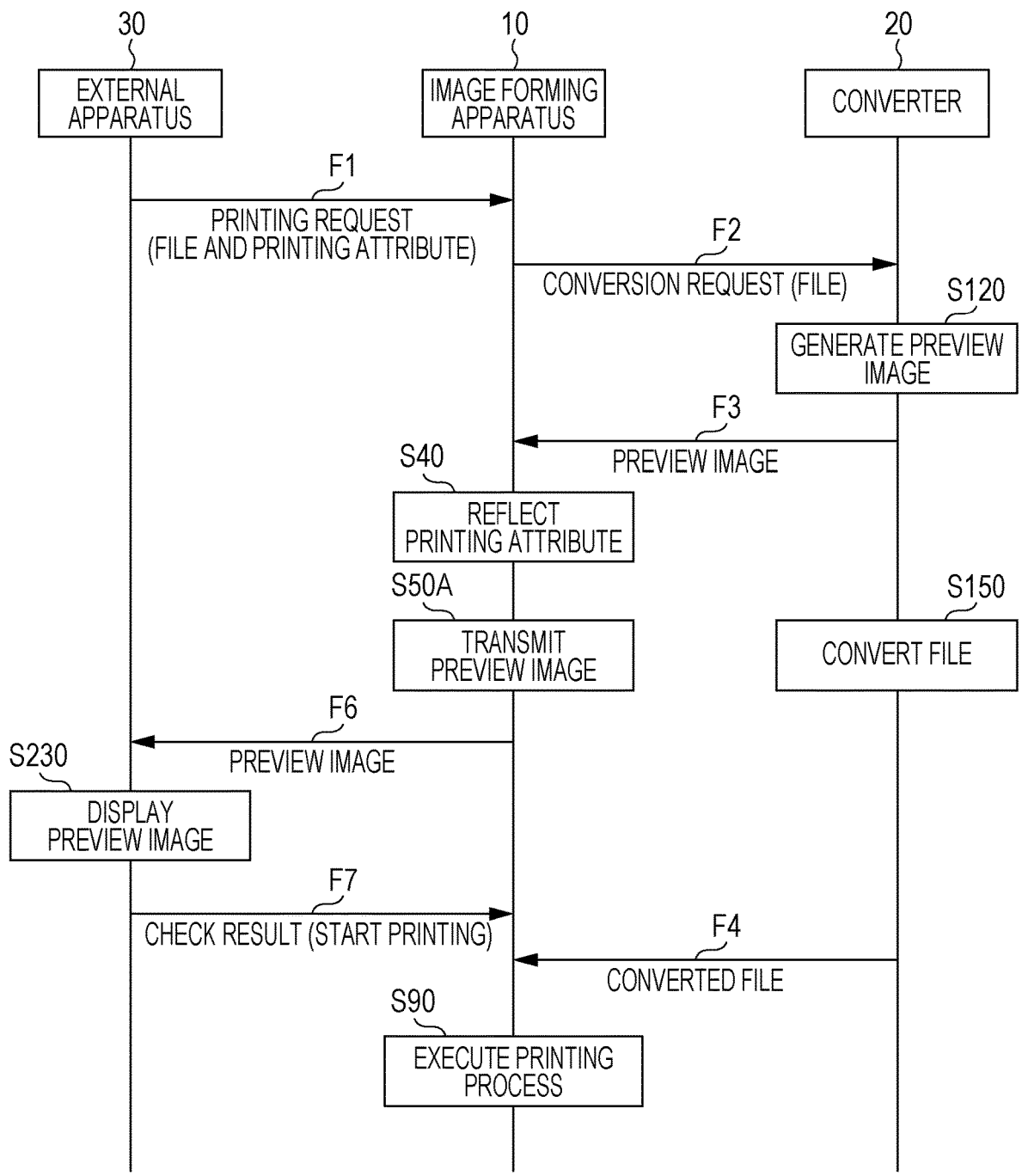
FIG. 13 is a sequence diagram illustrating an example case where an image is formed on a recording medium in the third exemplary embodiment.
Figure 14:
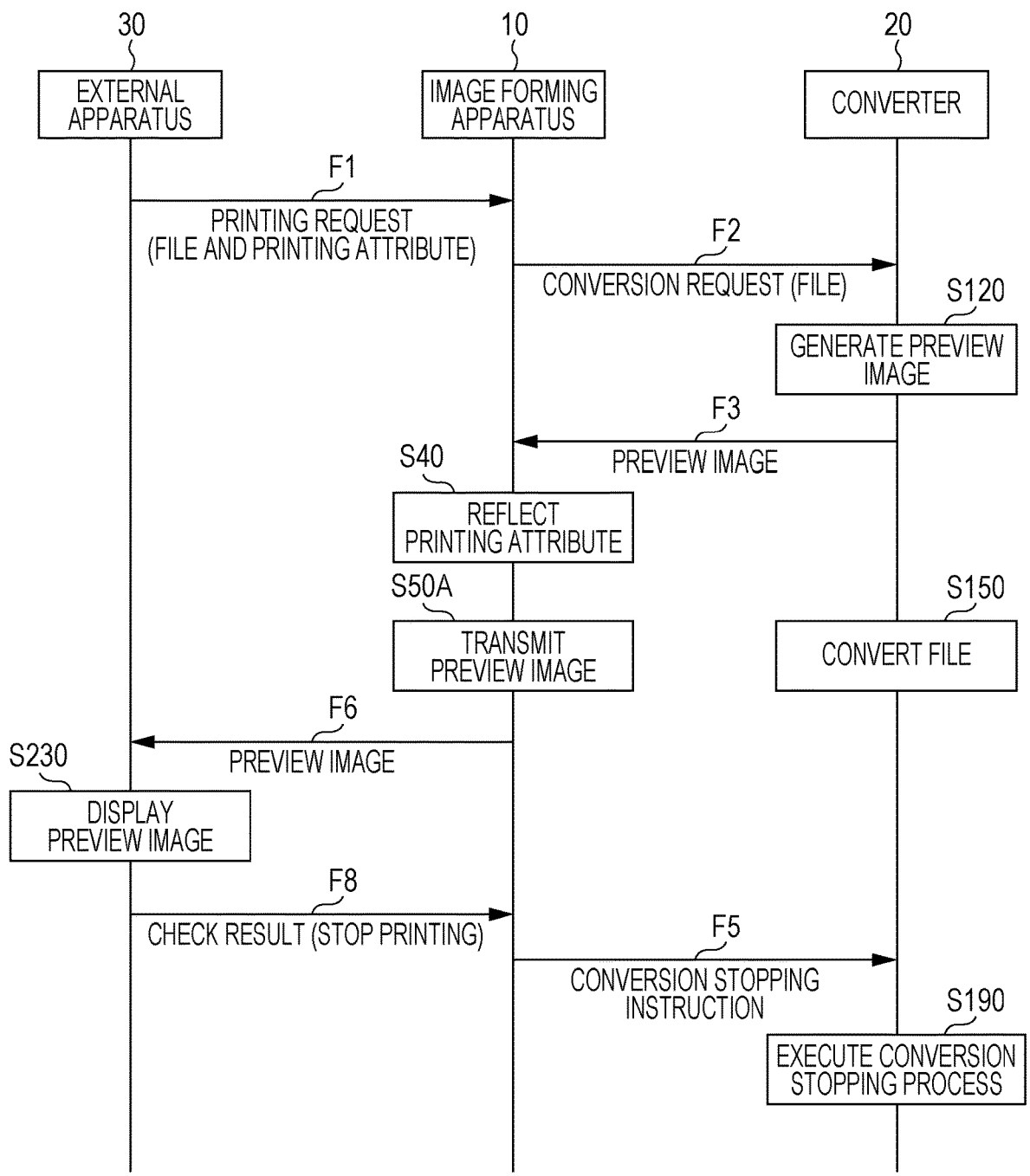
FIG. 14 is a sequence diagram illustrating an example case where image forming is stopped in the third exemplary embodiment.

FIG. 11 is a flowchart illustrating an example flow of an image forming process executed by the CPU 61 after the image forming apparatus 10B is started. FIG. 12 is a flowchart illustrating an example flow of a printing request process executed by the CPU 71 when a file requested to be printed by the image forming apparatus 10B is selected by using the external apparatus 30. FIG. 13 is a sequence diagram illustrating an example case where an image is formed on the recording medium P. FIG. 14 is a sequence diagram illustrating an example case where image forming is stopped.

The image forming process illustrated in FIG. 11 is different from the image forming process illustrated in FIG. 5 in that step S50 is replaced with step S50A, and the other steps are the same as those in the image forming process illustrated in FIG. 5.

In step S40, the CPU 61 reflects a printing attribute in the preview image received from the converter 20. In step S50A thereafter, the CPU 61 transmits the preview image having undergone the reflection of the printing attribute to the external apparatus 30 having transmitted the file corresponding to the preview image (see F6 in FIGS. 13 and 14).

In step S60, the CPU 61 in response judges whether a preview-image check result is received. The preview-image check result is transmitted from the external apparatus 30 via the communication network 40.

In accordance with a Start Printing or Stop Printing check result received from the external apparatus 30, the CPU 61 performs step S70 and the corresponding one or more subsequent steps that have been described.

It goes without saying that step S50 in the image forming process that is the modification of the first exemplary embodiment and that is illustrated in FIG. 9 may be replaced with step S50A illustrated in FIG. 11.

Compared with the image forming process executed by the image forming apparatus 10B in this manner, the external apparatus 30 executes the conversion process illustrated in FIG. 12. Note that the external apparatus 30 has selected the file to be requested to be printed by the image forming apparatus 10B.

In step S210 in FIG. 12, the CPU 71 transmits, to the image forming apparatus 10B, the printing request including the selected file, the printing attribute to be applied to the selected file, and the user ID of the user who requests the printing of the file (see F1 in FIGS. 13 and 14).

If the image forming apparatus 10B in response executes step S50A in FIG. 11 described above, the preview image having undergone the reflection of the printing attribute is transmitted to the external apparatus 30.

Accordingly, in step S220, the CPU 71 judges whether the preview image is received from the image forming apparatus 10B via the communication network 40. If the preview image is not received, the CPU 71 repeats step S220 and monitors whether the preview image is received. If the preview image is received, the process moves to step S230.

In step S230, the CPU 71 causes the display unit 52 of the external apparatus 30 to display the preview image received in step S220.

The user who requests the printing of the file checks the preview image displayed on the display unit 52 of the external apparatus 30 and designates Start Printing or Stop Printing from the input unit 51 of the external apparatus 30.

In step S240, the CPU 71 in response judges whether the preview-image check result is received. If the preview-image check result is not received, the CPU 71 repeats step S240 and monitors whether the check result is received. If the check result is received, the process moves to step S250.

In step S250, the CPU 71 transmits the check result received in step S240 to the image forming apparatus 10B. If Start Printing is received from the input unit 51 of the external apparatus 30, the CPU 71 transmits the check result as an instruction for Start Printing to the image forming apparatus 10B (see F7 in FIG. 13). In contrast, if Stop Printing is received from the input unit 51 of the external apparatus 30, the CPU 71 transmits the check result as an instruction for Stop Printing to the image forming apparatus 10B (see F8 in FIG. 14). The printing request process illustrated in FIG. 12 is then terminated.

As described above, the image forming apparatus 10B according to the third exemplary embodiment causes the display unit 52 of the external apparatus 30 to display the preview image of the file requested to be printed.

The present invention has heretofore been described by using the exemplary embodiments, but the scope of the invention is not limited to the scope described in the exemplary embodiments. Various modifications and improvements may be made to each exemplary embodiment without departing from the spirit of the invention, and the form of the exemplary embodiment to which the modifications and improvements are made is included in the technical scope of the invention. For example, the order of processing steps may be changed without departing from the spirit of the present invention.

In the exemplary embodiments, the content of the present invention has been described by using the image forming apparatuses 10, 10A, and 10B. However, the present invention is applied to an information processing apparatus that receives a file a description format of which is to undergo conversion and a request for the conversion of the description format of the file and that displays a preview image before the conversion of the description format of the file is complete. That is, the image forming apparatuses 10, 10A, and 10B are an example of the information processing apparatus, and the image forming program is an example of an information processing program that causes a computer to function as the information processing apparatus. Examples of the information processing apparatus include a three-dimensional printer that receives a file including three-dimensional data and shapes a three-dimensional object.

In each exemplary embodiment, the form in which the image forming process is implemented by software has heretofore been described as an example, but processes equivalent to those in flowcharts illustrated FIGS. 5, 6, and 9 to 12 may be implemented in, for example, an application specific integrated circuit (ASIC) and thereby may be executed by hardware.

In each exemplary embodiment described above, the form in which the image forming program and the conversion program have been installed in the ROM has been described, but the exemplary embodiment is not limited to this form. The image forming program and the conversion program according to the exemplary embodiment may be provided in such a manner as to be recorded in a computer readable storage medium. For example, the image forming program and the conversion program according to the exemplary embodiment may be provided in such a manner as to be stored in an optical disk such as a compact disc ROM (CD-ROM) or a digital versatile disc ROM (DVD-ROM). The image forming program and the conversion program according to the exemplary embodiment may also be provided in such a manner as to be recorded in a semiconductor memory such as a universal serial bus (USB) memory or a flash memory. Further, the image forming apparatuses 10, 10A, and 10B, the converter 20, and the external apparatus 30 may acquire the image forming program according to the exemplary embodiment via a communication network such as the Internet from an apparatus connected to the communication network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a controller configured to:
      receive a file in a description format that is to undergo a conversion;
      receive a request for the conversion of the description format of the file;
      cause a display device to display an image representing content of the file before the conversion of the description format of the file is complete; and
      cause the display device not to display the image for the user until an authentication period of the different user ends if a different user who is different from a user who requests the conversion of the description format of the file is using the information processing apparatus.

2. The information processing apparatus according to claim 1,
wherein the controller is configured to control a conversion process for the file to perform the conversion of the description format of the file after causing the display device to display the image.

3. The information processing apparatus according to claim 1,
wherein the controller is configured to control a conversion process for the file, the control of the conversion process being performed to start the conversion of the description format of the file before the controller receives a check result that is a result of checking the content represented by the image displayed on the display device.

4. The information processing apparatus according to claim 3,
wherein the controller is configured to stop the conversion process by a converter that converts the description format of the file if the controller receives a stopping instruction for stopping the conversion of the description format of the file as the check result.

5. The information processing apparatus according to claim 1,
wherein the controller is configured to cause the display device to display, as the image, at least part of the content of the file.

6. The information processing apparatus according to claim 5,
wherein the controller is configured to cause the display device to display, as the image, the at least part of the content of the file if a data amount of the file is equal to or larger than a predetermined data amount.

7. A non-transitory computer readable medium storing an information processing program causing a computer to function as the controller of the information processing apparatus according to claim 1.

8. An image forming apparatus comprising:
the information processing apparatus according to claim 1; and
an image forming unit configured to image, on a recording medium, content of a file in a description format that is to undergo conversion.

9. The image forming apparatus according to claim 8, further comprising:
a generator configured to perform reflection of a forming attribute in the content of the file received from the information processing apparatus, wherein the forming attribute is to be used when the content of the file is imaged on the recording medium, and the generator is configured to generate content resulting from the reflection as the image.

10. A non-transitory computer readable medium storing an image forming program causing a computer to function as the generator of the image forming apparatus according to claim 9.

11. An information processing system comprising:
the information processing apparatus according to claim 1; and
a converter, wherein
the information processing apparatus is configured to transfer a file received from a user to the converter,
the converter is configured to
perform conversion of a description format of the file to a predetermined description format, the converter receiving the file transferred from the information processing apparatus, and
transmit a first image representing content of the file to the information processing apparatus, the converter transmitting a converted file to the information processing apparatus after receiving the file and after transmitting the first image, the converted file resulting from the conversion of the description format of the file to the predetermined description format, and
the information processing apparatus is configured to cause a display device to display a second image obtained from the first image received from the converter, the information processing apparatus causing the display device to display the second image before receiving the converted file from the converter.

12. The information processing system according to claim 11,
wherein the converter is configured to perform the conversion of the description format of the file after generating the first image.

13. The information processing system according to claim 11,
wherein the converter is configured to start the conversion of the description format of the file before receiving an instruction based on a check result from the information processing apparatus, the check result being a result of checking content of the second image.

14. The information processing system according to claim 13,
wherein the information processing apparatus is configured to transmit the instruction for stopping the conversion of the description format performed on the file to the converter if the information processing apparatus receives a stopping instruction for stopping the conversion of the description format of the file as the check result.

15. The information processing system according to claim 11,
wherein the converter is configured to generate at least part of the content of the file as the first image and transmit the first image to the information processing apparatus.

16. The information processing system according to claim 15,
wherein the converter is configured to generate the at least part of the content of the file as the first image and transmit the first image to the information processing apparatus if a data amount of the file is equal to or larger than a predetermined data amount.

17. The information processing system according to claim 11, further comprising:
an external apparatus including the display device,
wherein the information processing apparatus is configured to transmit the second image to the external apparatus having transmitted the file if the information processing apparatus receives the file from the external apparatus.

18. The information processing system according to claim 11,
wherein the information processing apparatus includes an image forming unit configured to image the content of the file on a recording medium, and
wherein the information processing apparatus is configured to receive the file and a forming attribute to be used when the content of the file is imaged on the recording medium, and the information processing apparatus is configured to cause the display device to display, as the second image, content resulting from reflection of the forming attribute in the first image received from the converter.

\* \* \* \* \*